United States Patent [19]
Cooke et al.

[11] Patent Number: 6,128,972
[45] Date of Patent: *Oct. 10, 2000

[54] TWIN MASS FLYWHEEL

[75] Inventors: Richard David Maitland Cooke, Warwick; Anthony John Curtis, Leamington Spa, both of United Kingdom

[73] Assignee: Automotive Products, PLC, Leamington Spa, United Kingdom

[ * ] Notice: This patent is subject to a terminal disclaimer.

[21] Appl. No.: 09/305,794

[22] Filed: Apr. 30, 1999

Related U.S. Application Data

[62] Division of application No. 08/971,815, Nov. 17, 1997, which is a division of application No. 08/681,280, Jul. 22, 1996, Pat. No. 5,819,598, which is a division of application No. 08/094,111, May 23, 1994, Pat. No. 5,557,984.

[30] Foreign Application Priority Data

Jan. 30, 1991 [GB] United Kingdom .................. 91 02029

[51] Int. Cl.$^7$ ...................................................... F16F 15/10
[52] U.S. Cl. ................................ 74/574; 74/572; 464/68; 192/30 V
[58] Field of Search ........................ 74/572–574; 464/68; 192/30 V

[56] References Cited

U.S. PATENT DOCUMENTS

| | | | |
|---|---|---|---|
| 5,557,984 | 9/1996 | Cooke et al. ............................ | 74/574 |
| 5,819,598 | 10/1998 | Cooke et al. .......................... | 74/572 X |
| 5,848,938 | 12/1998 | Curtis et al. .............................. | 464/66 |
| 5,941,134 | 8/1999 | Cooke et al. ............................. | 74/574 |
| 6,012,355 | 1/2000 | Sudau ....................................... | 74/574 |

FOREIGN PATENT DOCUMENTS

| | | | |
|---|---|---|---|
| 19792666 | 5/1998 | Germany ................................. | 74/574 |
| WO 89/01097 | 2/1989 | WIPO ...................................... | 74/572 |
| WO 94/10477 | 5/1994 | WIPO ...................................... | 74/574 |
| WO 94/20769 | 9/1994 | WIPO ...................................... | 74/574 |

*Primary Examiner*—Vihn T. Luong
*Attorney, Agent, or Firm*—Paul E Milliken; Lee A Germain

[57] ABSTRACT

A twin mass flywheel for a vehicle comprising two coaxially arranged relatively rotatable masses interconnected by a plurality of pivotal linkages. Each linkage comprises a first link pivotally connected to one flywheel mass, a second link pivotally connected to the other flywheel mass and a pivot joining the links to move radially outwardly. A resilient torque member in each common pivot operable after a predetermined rotation between the flywheel masses to resist said relative rotation. A variable hysteresis friction damping assembly, whose resistance to relative rotation changes as the relative angle of rotation is altered, acts between the flywheel masses. The damping assembly can be provided by two friction damping plates which operate at different stages of rotation. The relative rotation may be limited by a stop member on at least one of the flywheel masses which abuts an abutment surface on the other flywheel mass. The abutment surface can be resilient for cushioning abutment by the stop member.

5 Claims, 6 Drawing Sheets

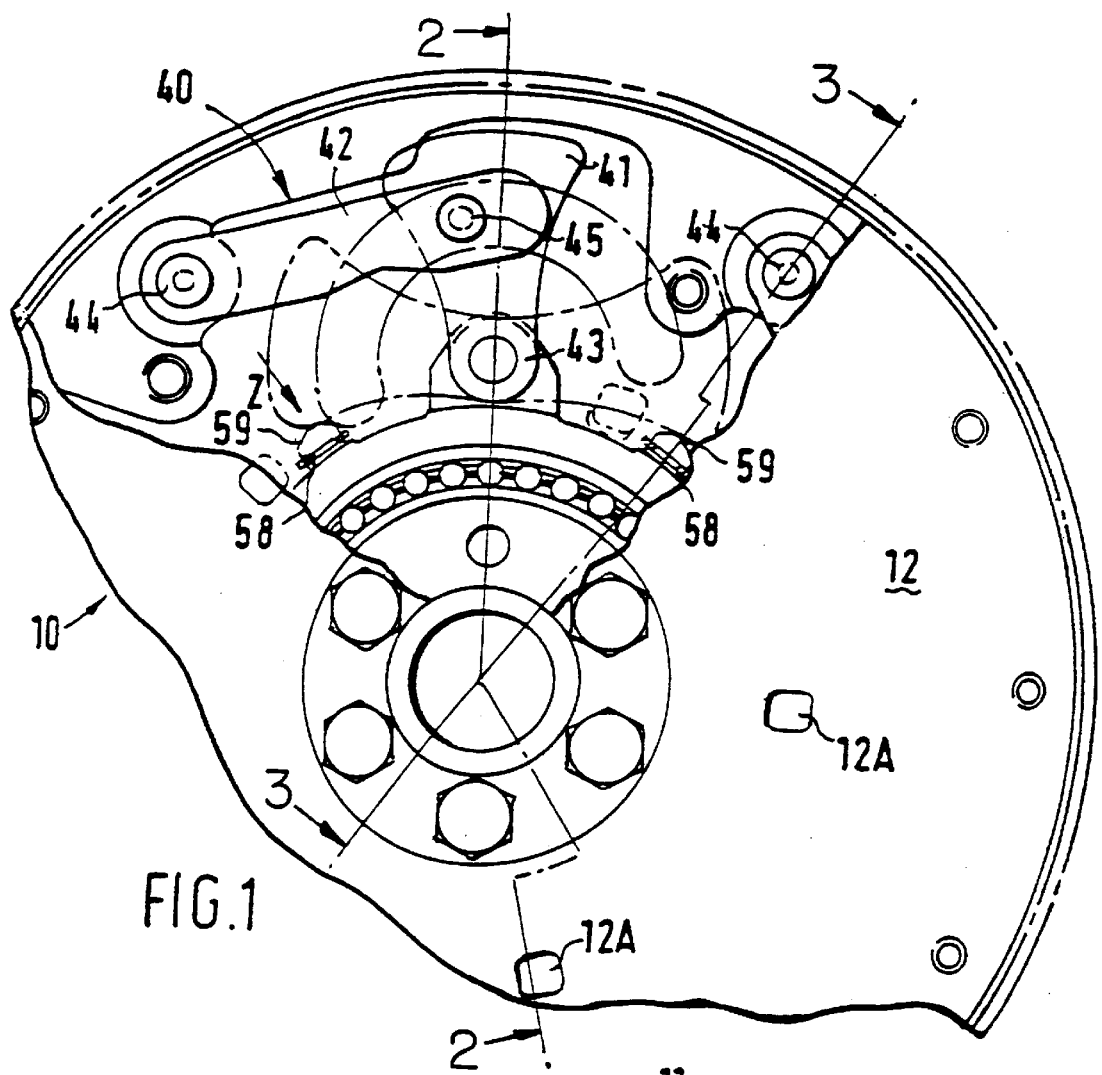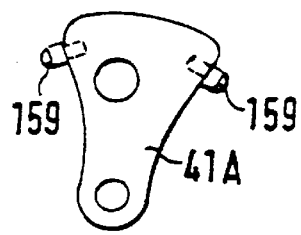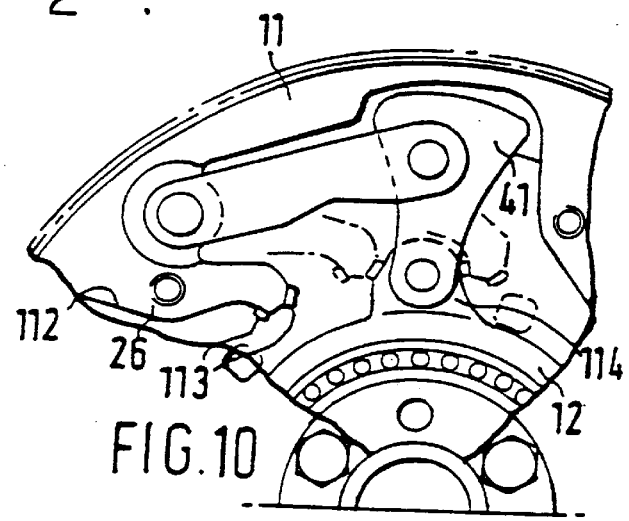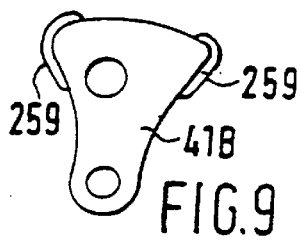

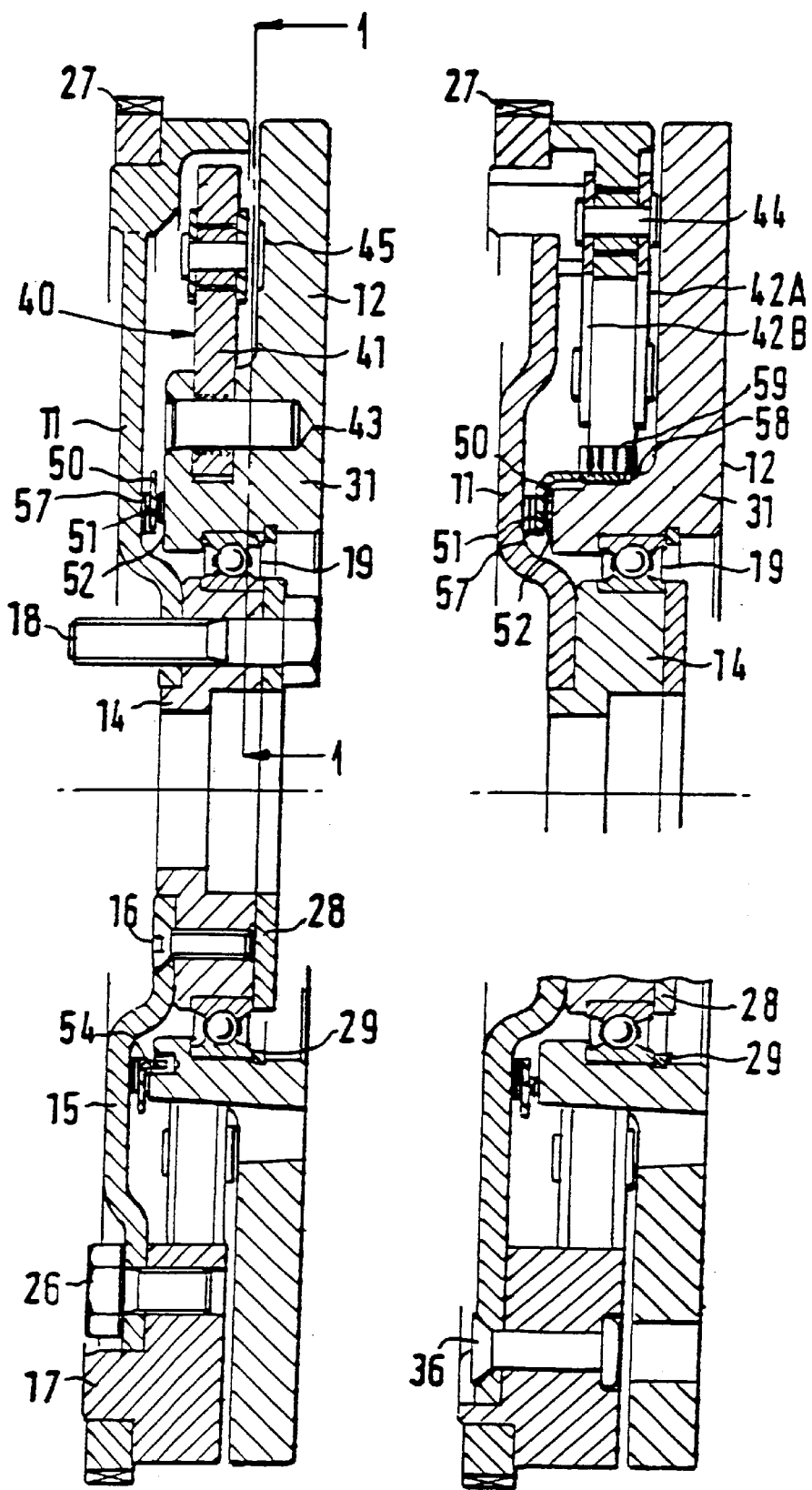

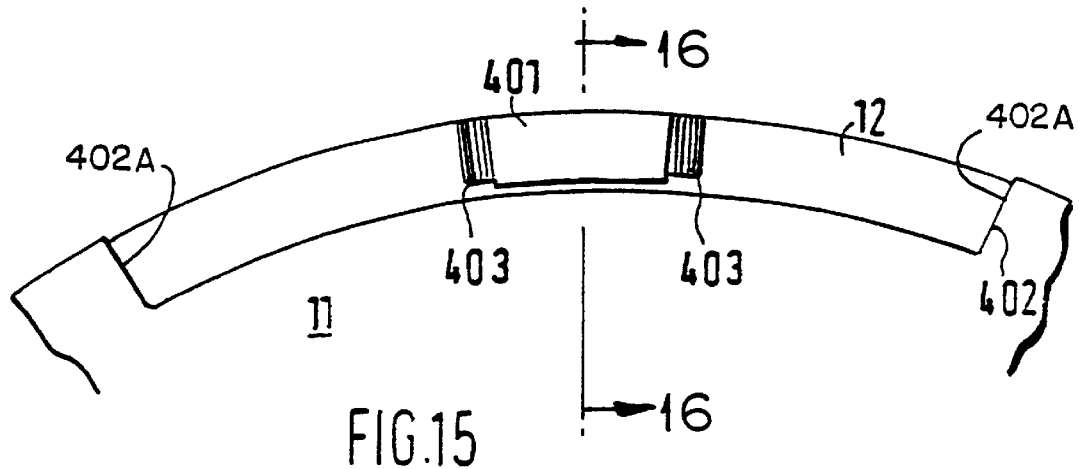
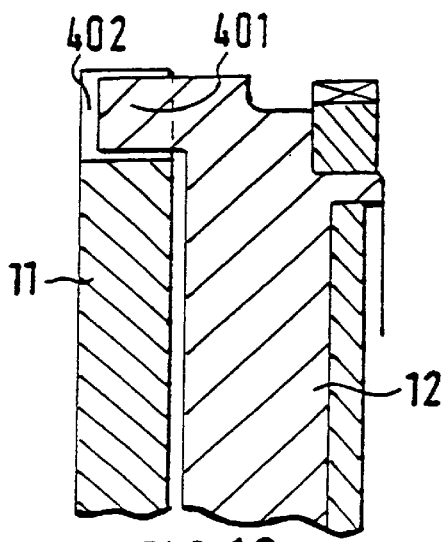
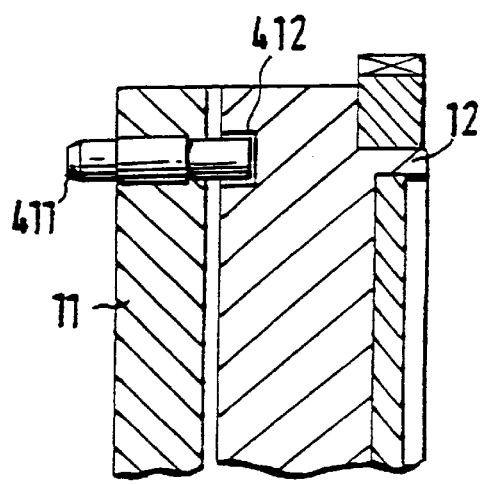
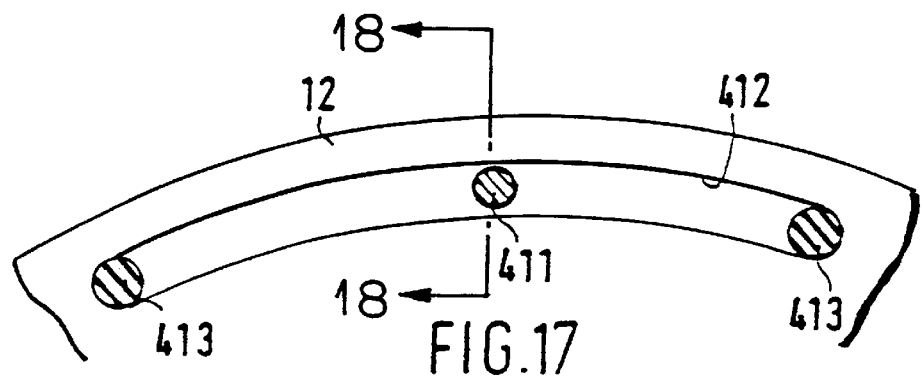

TWIN MASS FLYWHEEL

RELATED INVENTIONS

This invention is a divisional of Ser. No. 08/971,815 filed Nov. 17, 1997 which is now pending and allowed which in turn is a divisional of Ser. No. 08/681,280 filed Jul. 22, 1996 which is now U.S. Pat. No. 5,819,598 which in turn is a divisional of application Ser. No. 08/094,111 filed May 23, 1994 which is now U.S. Pat. No. 5,557,984.

FIELD OF THE INVENTION

The present invention relates to a twin mass flywheel arrangement for absorbing or Compensating for torsional vibrations such as can arise in a vehicle transmission assembly.

BACKGROUND OF THE INVENTION

More particularly, the invention relates to a twin mass flywheel of the type described in WO 89/01097 in which two coaxial flywheel masses which are mounted for limited angular rotation relative to each other; and a plurality of pivotal linkages interconnect the two flywheel masses each comprising a first link pivotally connected one of the flywheel masses, and a second link pivotally connected to the other of the flywheel masses, and means for pivotally connecting the first and second links.

A friction damping means, may be used to resist relative angular rotation between the two flywheel masses.

The present invention provides an improved friction damping means between the flywheel masses.

SUMMARY OF THE INVENTION

According to the invention there is provided a twin mass flywheel for a vehicle comprising two co-axially arranged flywheel masses which are mounted for limited angular rotation relative to each other; and a plurality of pivotal linkages interconnecting the two flywheel masses each linkage comprising a first link pivotally connected to one of the flywheel masses, a second link pivotally connected to the other of the flywheel masses, and a pivot for pivotally connecting the first and second links, said linkage showing a greater mass adjacent the pivot means so that centrifugal force will cause the pivot means to move radially outwardly, and a friction damping means which in use resists relative angular rotation between the two flywheel masses, and provides a variable hysteresis friction damping means whose resistance to said rotation changes as the relative angle of rotation is altered, characterised in that at least one of the flywheel masses has cushioning means thereon to engage directly against the other of the flywheel masses at the limit of relative rotation in at least one direction of relative rotational movement.

Also according to the invention there is provided a twin mass flywheel for a vehicle comprising two co-axially arranged flywheel masses which are mounted for limited angular rotation relative to each other; and a plurality of pivotal linkages interconnecting the two flywheel masses each linkage comprising a first link pivotally connected to one of the flywheel masses, a second link pivotally connected to the other of the flywheel masses, and a pivot means for pivotally connecting the first and second links, said linkage having a greater mass adjacent the pivot means so that centrifugal force will cause the pivot means to move radially outwards, and in each linkage one of said links has an increased mass and acts as a bob weight and each bob weight has a cushioning means thereon to act against at least one of the flywheel masses to cushion any impacts between the bob weight and said flywheel masses.

BRIEF DESCRIPTION OF THE DRAWINGS

For a better understanding of the present invention and to show more clearly how to carry it into effect reference will now be made, by way of example, to the accompanying drawings in which;

FIG. 1 is a cross-sectional view of part of one embodiment of a twin mass flywheel according to the present invention taken along the line 1—1 in FIG. 2;

FIG. 2 is a cross sectional view taken along the line 2—2 in FIG. 1;

FIG. 3 is a cross sectional view taken along the line 3—3 in FIG. 1 also showing an alternative flywheel mass assembly for one of the flywheel masses.

FIGS. 8 and 9 show alternative bob weights.

FIG. 10 is a cross-sectional view of a second embodiment of a torque transmitting arrangement according to the present invention showing limiting means to limit the relative rotation between the flywheel masses.

FIG. 15 is an illustration of a flywheel according to FIG. 1 but with a means to limit rotation between the flywheel mass.

FIG. 16 is a section on the line 16—16 of FIG. 15.

FIG. 17 is a modification of the limiting device shown in FIG. 15 and 16.

FIG. 18 is a section on the line 18—18 of FIG. 17.

DESCRIPTION OF THE PREFERRED EMBODIMENTS

Figure 4:
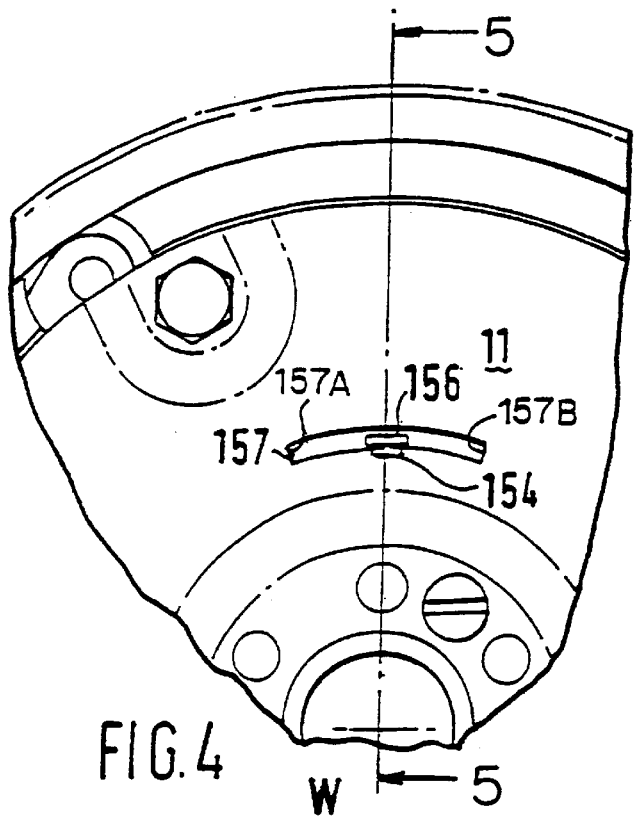
FIG. 4 is a view taken of an alternative twin mass flywheel having dual hysteresis friction damping.

With reference to FIGS. 1–3 of the accompanying drawings there is illustrated a twin mass flywheel 10 comprising a flywheel which is divided into two flywheel masses 11 and 12. The flywheel mass 11 is fixed on a crankshaft of an internal combustion engine (not shown) by way central hub 14 and bolts 18 and in use a friction clutch (not shown) is secured to the flywheel mass 12. Under normal drive conditions the flywheel masses 11, 12 rotates in an anticlockwise direction in the view shown in FIG. 1. Ducts. 12A for the passage of cooling air are provided in the flywheel mass 12. The flywheel mass 12 is mounted on the central hub 14 via a bearing 19.

The input flywheel mass 11 comprises the hub 14 which is fixed on crankshaft, a plate 15 fixed to the hub 14 by screws 16 and an annular outer mass 17 fixed to plate 15 by bolts 26 as shown in FIG. 2, or for example, by rivets 36 as shown in FIG. 3. A starter ring 27 is mounted on outer mass 17.

The second output flywheel mass 12 is mounted rotatably to the first flywheel mass 11 by way of bearing 19. The bearing 19 is non-rotatably mounted on the hub 14 and is secured in place by means of an annular plate 28. The outer race of the bearing 19 is non-rotatably mounted in the centre of the flywheel mass 12 and is secured in place by means of a retaining ring 29.

Relative rotation between the two flywheel masses 11 and 12 is controlled by a plurality of pivotal linkages 40 evenly spaced around the flywheel masses, preferably there are five such linkages, and by friction damping means 50. Each pivotal linkage 40 comprises a first link 41 pivotally mounted on a centre hub portion 31 of the flywheel mass 12 by way of a pivot 43 and a second link 42 pivotally mounted on the flywheel mass 11 by way of pivot 44, the two links 41 and 42 being pivotally connected to each other by means of a third pivot 45. It will be noted from FIG. 1 that the pivot 43 is positioned radially inwardly of the pivots 44 and 45 and that the pivot 45 is positioned radially inwardly of the pivots 44. The first link 41 is formed as a bob weight mass having a concentration of mass at its end remote from the pivot 43. The second link 42 comprises a pair of parallel arms 42A, 42B which are arranged one on each axial side of the bob weight 41. Each radial side of the bob weight 41 is curved and the radius of curvature is substantially the same as that of a central hub portion 31 of the flywheel mass 12, to enable the bob weights to engage with the hub portion along a substantial part of their length to facilitate the construction of a compact unit.

The friction damping means 50 comprises an annular plate 51 having a friction washer thereon and which is mounted on the face of the centre hub portion 31 and is urged towards the first flywheel mass 11 by a Belleville spring 52. The first friction plate 51 is prevented from rotating relative to the flywheel mass 12 by means of lugs 54 provided on plate 51 which extend into slots provided in the flywheel mass 12.

Figure 14:
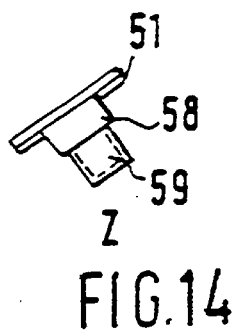
FIG. 14 is a view in the direction of arrow Z in FIG. 1.

The annular friction plate 51 also has a plurality of circumferative tabs 58 (one for each bob weight) thereon, that extend axially over the outer periphery of the centre hub portion 31 of the second flywheel mass 12. Each tab 58 carries on its radially outer side a resilient cushion means 59 or buffer to provide a stop for the bob weights to dampen out shocks and noise. (see FIG. 14). Each resilient buffer 59 acts as a buffer for each of the two adjacent bob weights depending upon the relative direction of rotation of the two flywheel masses.

Operation of the twin mass flywheel shown in FIGS. 1 and 3 will now be described. Under no-load conditions with the clutch disengagement, centrifugal force acts on the pivotal linkages 40 and particularly on the bob weights 41 and urges the linkages in a radially outward direction. At higher rotational speeds the centrifugal force is greater and whilst this does not affect the configuration under no-load conditions it greatly affects the force required to move the flywheel mass 12 relative to the flywheel mass 11.

If the clutch is engaged and power is transmitted from flywheel mass 11 to flywheel mass 12 there is a tendency for the two masses to rotate relative to each other in a drive direction. At relatively low speeds when the influence of centrifugal force is small the flywheel masses move readily relative to each other. However at relatively high speeds the influence of centrifugal, force is much greater and relative rotation of the flywheel masses requires greater force.

Under conditions of over-run the effects are similar except that in the embodiments described the link 42 folds under the bob weight 41, and the curved face of the bob weight eventually comes to bear against the buffer 59 on the hub centre portion 31 of the flywheel mass 12 which forms a travel stop an prevents further relative movement in the overrun direction of the flywheel masses.

The friction damping 50 is also operative during the relative rotational movement between the twin flywheel mass 11 and 12. The friction plate 51 is rotationally fast with the second flywheel mass 12 and the friction washer 57 rubs on the plate 15 of the first flywheel mass 11.

Figure 5:
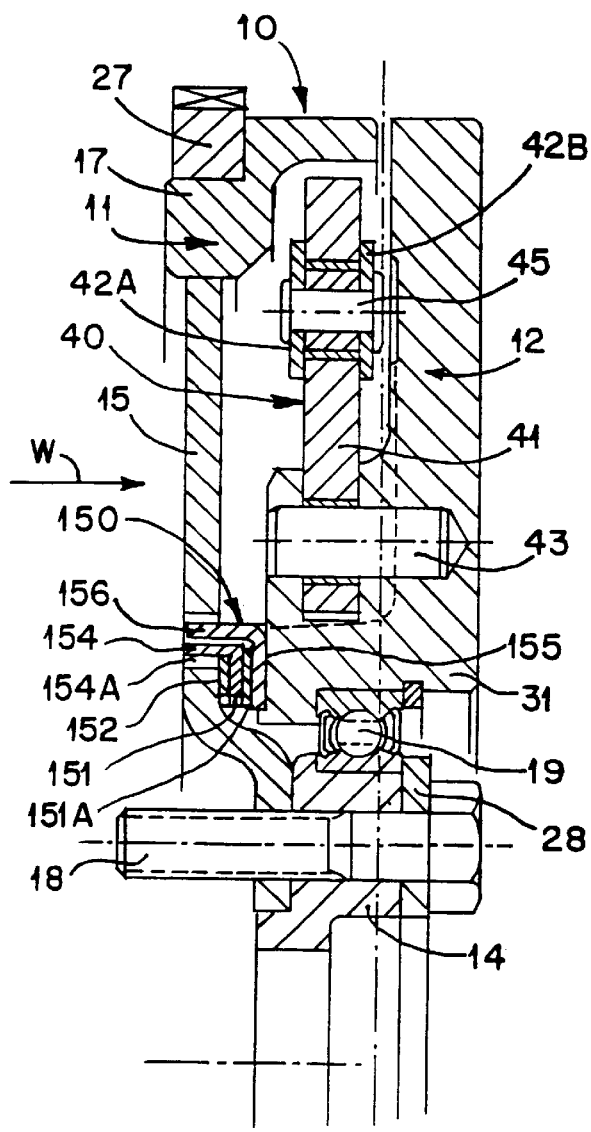
FIG. 5 is a cross-sectional view taken along the line 5—5 in FIG. 4.

With reference to FIGS. 4 and 5, there is illustrated a second embodiment of the invention in which the friction damping means 150 is a variable hysteresis damper comprising a first annular friction plate 151 which is mounted on the plate 15 of the first flywheel mass 11 and is urged towards the second flywheel mass 12 by a Belleville spring 152. The first friction plate 151 is prevented from rotating relative to the plate 15 by means of lugs 154 provided on plate 151 which extend into slots provided in the first flywheel mass 11. This is best seen in FIG. 4. The friction damping means 150 also includes a second annular friction plate 155 which engages against the central portion 31 of the second flywheel mass 12 and has a lug 156 which extends axially over the radially outer edge of the first friction plate 51 to engage in a circumferentially elongated slot 157 in the plate 15 so that there is lost motion connection between the plate 15 and the second friction plate 155.

The first friction plate 151 has a polymeric friction washer 151A (preferably nylon) attached thereto to give a frictional engagement with the second plate 155, and has a coefficient of friction of about 0.2.

The second friction plate 155 has a metal-on-metal friction engagement with the second flywheel mass 12 which has a coefficient of friction in excess of that of the polymeric friction washer, and preferably in the order of 0.6.

The second friction plate 155 also has a plurality or circumferative tabs (not shown) thereon, that extend axially over the outer periphery of the centre hub portion 31 of the second flywheel mass 12, and which each have a resilient cushion or buffer thereon to provide a stop for the bob weights to dampen out shocks and noise. (as shown in FIG. 1).

The variable hysteresis friction damping 150 is operative during the relative rotational movement between the two flywheel masses 11 and 12. For an initial relative movement the first friction plate 151, which is fast with the first flywheel mass 11, moves relative to the-second friction plate 155, which is held fast relative to the second flywheel mass 12 by its metal-metal frictional engagement therewith.

In this condition the polymeric friction washer adhered to the first plate 151 generates the friction damping. Once sufficient rotational movement between the two flywheel masses 11,12 has taken place, and the tab 156 on the second friction plate 155 abuts an end 157A, 157B of the aperture 157 in the plate 15, then the second friction plate 155 is held stationery relative to the first flywheel mass 11 and any further relative rotational movement will cause the second flywheel mass 12 to rotate relative to the second friction plate 155. This causes an increase in friction damping effect due to the higher coefficient of friction metal-on-metal rubbing engagement between these two components 155 and 12.

FIG. 8 and FIG. 9 show alternate bob weights 41A and 41B having resilient cushioning means or buffers 159 and 259 thereon respectively.

FIG. 10 illustrates direct stop means to limit the relative rotational movement between the flywheel masses 11 and 12. The first flywheel mass 11 has a plurality of radially inward projections 112 thereon preferably five spaced projections, which are on a tangential locus relative to the flywheel masses and are arranged between adjacent bob weights 41 on the other flywheel mass 12. There are resilient cushioning means 113, for example rubber pads, on the radial faces of the inner ends of each projection 112. These pads 113 abut lugs 114 on the centre hub portion 31 of the second flywheel mass 12 from which the bob weights 41 are pivoted.

Figure 6:
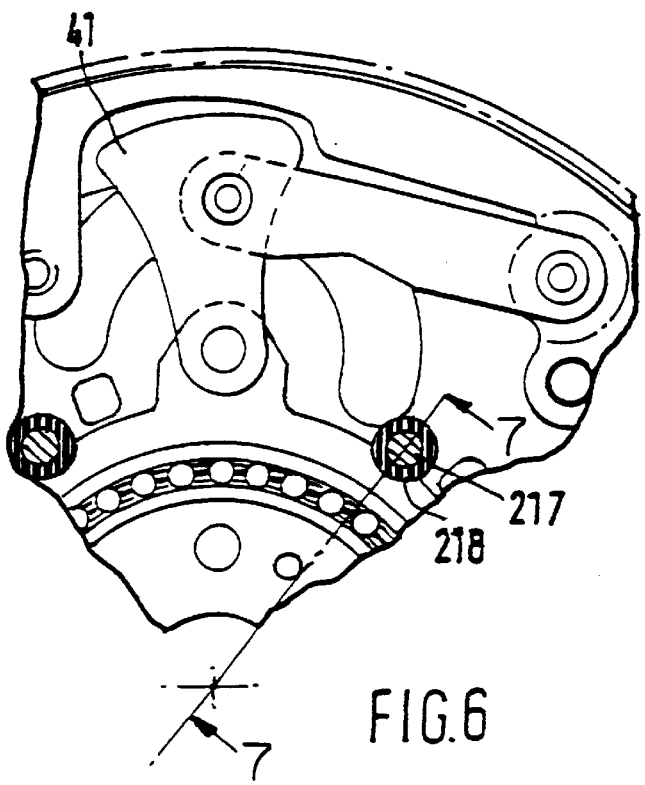
FIG. 6 is a partial cross-sectioned view similar to FIG. 1 but showing alternative stops for bob weights.
Figure 7:
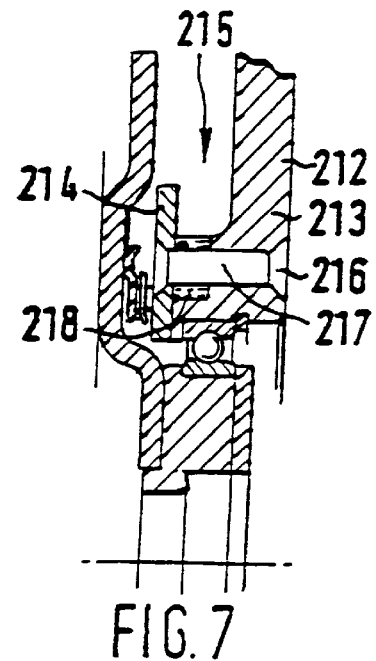
FIG. 7 is a cross-sectional view taken along line 7—7.

A further embodiment of the invention is shown in FIGS. 5, 6 and 7 in which the second flywheel mass 212 comprises a first annular body 213 and a coaxial annular plate 214 attached thereto by fasteners 216 to form an annular space 215 in which the bob weights 41 are located for pivotal movement. The fasteners 216 each comprises an inner set screw or rivet 217 and a resilient cushioning means in the form of an outer elastomeric bush 218. At the limits of rotational movement the bob weights will impact against the elastomeric bushes 218.

Figure 12:
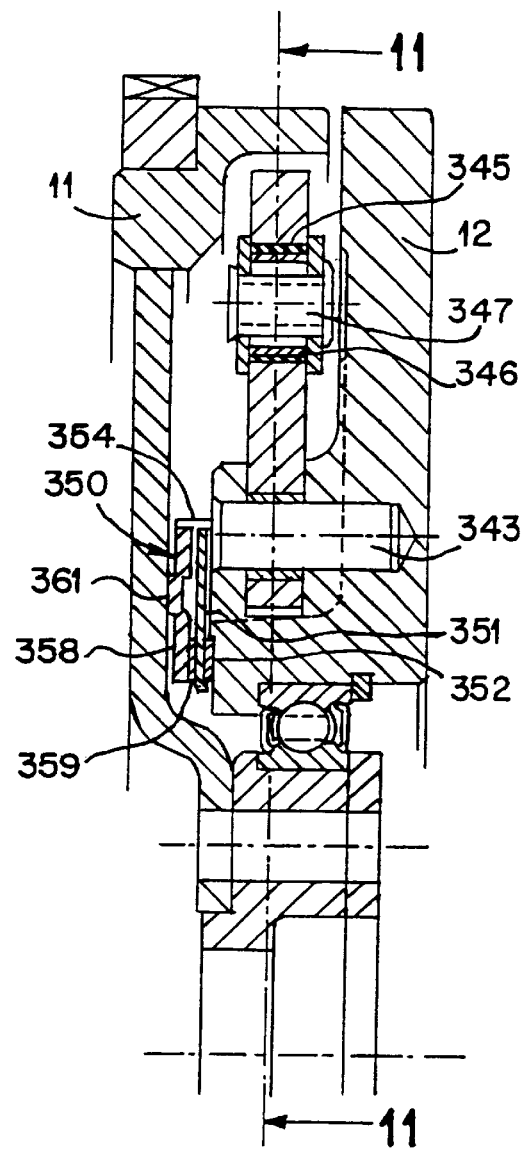
FIG. 12 is on the line 12—12 in the FIG. 11.
Figure 11:
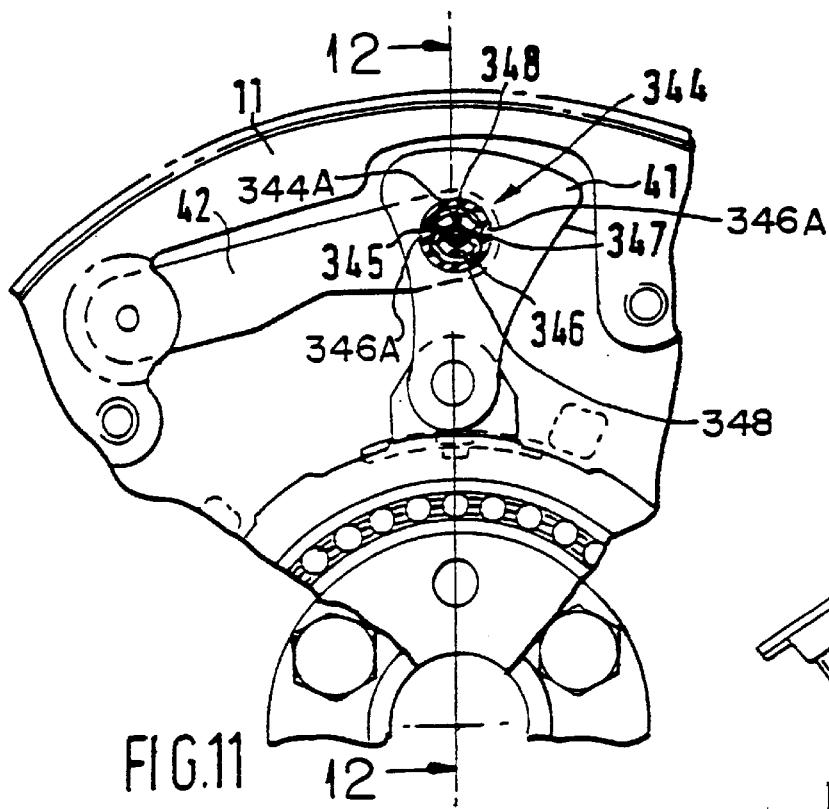
FIG. 11 is a partial cross-section view on the 11—11 of FIG. 12 of another embodiment of the invention.
Figure 13:
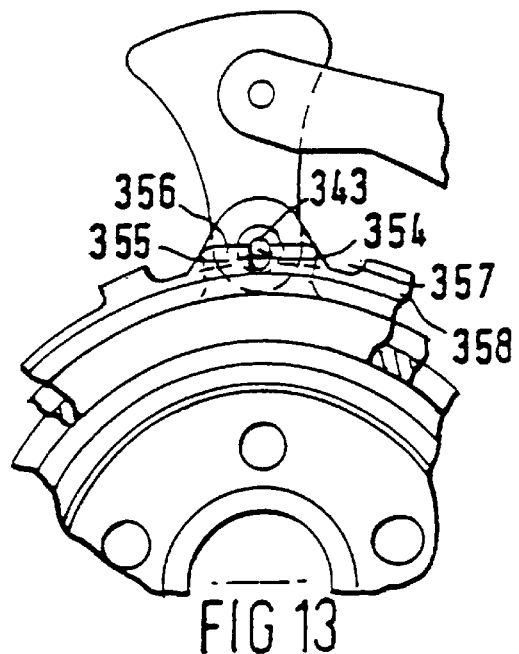
FIG. 13 view iii the direction of arrow S in FIG. 12.

Yet another embodiment of the invention is disclosed in FIGS. 11, 12 and 13. The common pivot 345 between the bob weight 41 and the other link 42 includes a torsion damper 344 or resilient torque means. The torsion damper comprises a rubber bush 344A fixed fast to the bob weight 41 with a cylindrical insert 346 fixed fast within the centre of the bush 344A. The insert 346 has radially inwardly projecting lugs thereon. An inner pin 347 is fixed to the other link 42 so that it rotates with the other link 42 relative to the bob weight 41. The pin 347 has outwardly projecting lug 348 thereon. As the bob weight 41 moves relative to the link 42, at the end portion of its relative movement, the lugs 348 of the pin 347 abut the lugs 346A on the insert 346 causing the elastomeric bush to wind-up and resist the relative rotation.

An alternative arrangement (not shown) is to use a split insert, and a rubber bush whose internal diameter is less than the outside diameter of the split insert. The inner pin (347) is then gripped by the split insert under the load applied by the bush. This exerts a friction damping on the movement between the bob weights and the links, and also provides a wear compensation means as the pin wears on the insert.

It can be readily understood that the embodiment of FIG. 11 could also use resilient cushions or buffers such as cushions 59 shown in FIG. 1 or the bob weight 41 could have cushioning stops or buffers such as buffers 159 and 259 shown in FIG. 8 and 9 respectively.

The friction damping means 350 (see FIG. 12) is operated by the pivots 343 for the bob weights 41. Each pivot 343 has a smaller diameter extension 354 that engages without substantial play in a radial slot 355 in a lug 356 on the first friction plate 351 which is adjacent the second flywheel mass, and engages a circumferentially elongated slot 357 in the outer peripheral edge of the second friction plate 358 adjacent the first flywheel mass 11.

The first friction plate 351 frictionally engages the second friction plate 358 via a polymeric friction washer 359 on its radially inner margin, and the second friction plate 358 engages he first flywheel mass through an annular rubbing surface 361 which is radially outward of the friction washer 354. Therefore when the friction damping 50 is operating the increase in hysteresis when the second friction plate 358 comes into operation is due not only to a change in the co-efficient of friction of the rubbing surfaces but also to an increase in the movement of the surface as the rubbing surfaces are transferred radially outwardly.

FIG. 15 and 16 illustrate an alternative means to that shown in FIG. 10 for limiting the rotation of the two flywheel masses 11,12 relative to each other. One half of the flywheel has an axial lug or lugs 401 that engage in a peripheral slot 402 with abutment surfaces 402A in the other half of the flywheel, preferably the input half. The lugs 401 may have resilient cushioning means for example rubber buffers 403 attached.

FIG. 17 and 18 show another construction in which a dowel pin 411 in the flywheel half 11 engages an arcuate slot 412 in the other flywheel half. In this case the rubber cushioning devices 413 are located in the ends of the slot 412.

We claim:

1. A twin mass flywheel comprising: two co-axially arranged flywheel masses which are mounted for limited angular rotation relative to each other and a plurality of pivotal linkages interconnecting the two flywheel masses, each linkage comprising a first link in the form of a bob weight pivotally connected to one of the flywheel masses, a second link pivotally connected to the other one of the flywheel masses, and a pivot for pivotally connecting the first and second links, the mass of each linkage being concentrated adjacent the pivot so that centrifugal force moves the pivot outwards, in which a cushioning means is directly secured to each bob weight to cushion the engagement between each bob weight and at least one of the flywheel masses.

2. A twin mass flywheel comprising: two co-axially arranged flywheel masses which are mounted for limited angular rotation relative to each other and a plurality of pivotal linkages interconnecting the two flywheel masses, each linkage comprising a first link in the form of a bob weight pivotally connected to one of the flywheel masses, a second link pivotally connected to the other of the flywheel masses and a pivot for pivotally connecting the first and second links, the mass of each linkage being concentrated adjacent the pivot so that centrifugal force moves the pivot outwards, resilient cushioning means secured to one of the flywheel masses for contact with each respective bob weight to cushion the engagement between each bob weight and said one flywheel mass.

3. A twin mass flywheel as claimed in claim 2 characterized in the cushioning means are spaced around said one flywheel mass so that each cushioning means acts as a buffer for each of two bob weights, depending upon the direction of relative rotation between the two flywheel masses.

4. A twin mass flywheel as claimed in claim 3 wherein the resilient cushioning means are attached to axially extending tabs on an outer periphery of a friction plate which is rotationally fast with said one flywheel mass and which extends axially across a center portion of the other flywheel mass.

5. A twin mass flywheel as claimed in claim 3 wherein the cushioning means comprises a rubber bush with a fastening means passing through the center thereof, said fastening means securing together two coaxial portions of said one flywheel mass to provide an annular location for the bob weights.

* * * * *